G. A. DAVIDSON.
POTATO SEED CUTTING MACHINE.
APPLICATION FILED MAY 31, 1921.
1,395,482.
Patented Nov. 1, 1921.
2 SHEETS—SHEET 2.
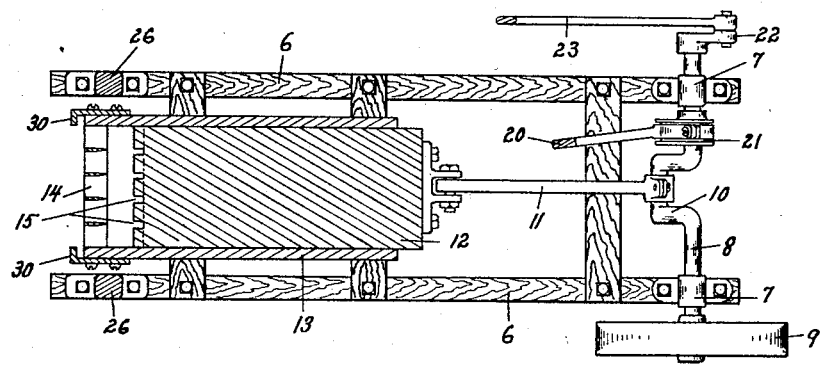
Fig-3-
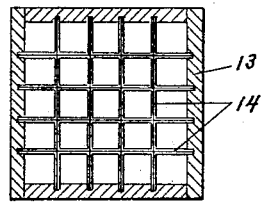
Fig-4-
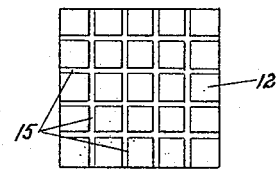
Fig-5-
Inventor
GEORGE A DAVIDSON
By A. E. Carleen
Attorney

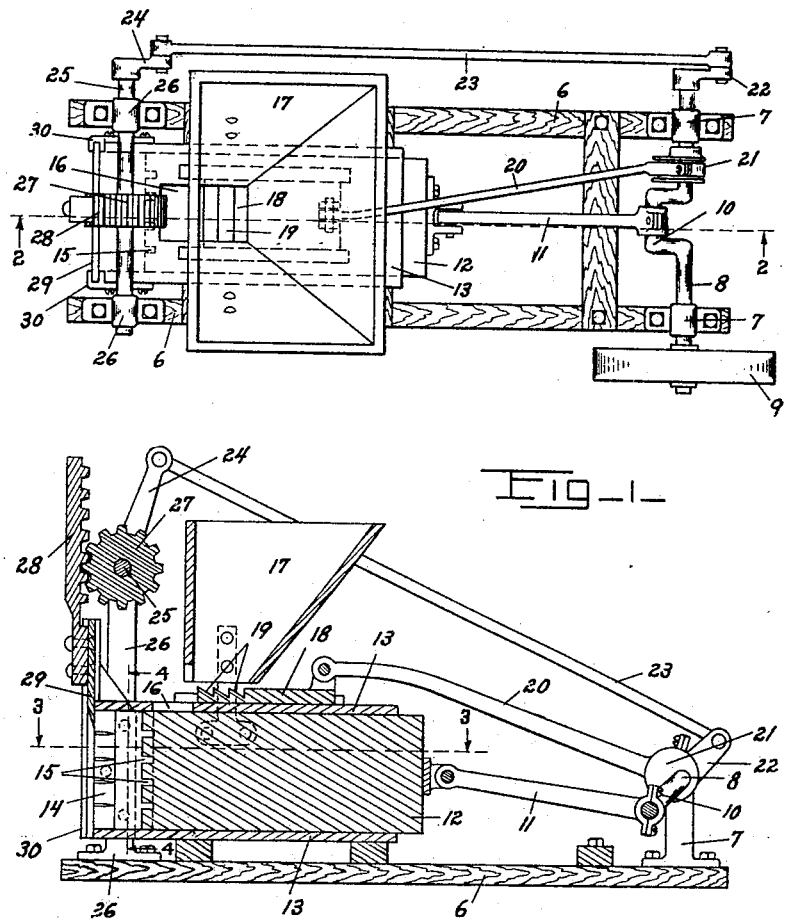

UNITED STATES PATENT OFFICE.

GEORGE A. DAVIDSON, OF ADA, MINNESOTA.

POTATO-SEED-CUTTING MACHINE.

1,395,482. Specification of Letters Patent. Patented Nov. 1, 1921.

Application filed May 31, 1921. Serial No. 473,863.

*To all whom it may concern:*

Be it known that I, GEORGE A. DAVIDSON, a citizen of the United States, residing at Ada, in the county of Norman and State of Minnesota, have invented certain new and useful Improvements in Potato-Seed-Cutting Machines, of which the following as a specification.

This invention relates to potato seed cutting machines and the main object is to provide a simple yet efficient, practical and economically constructed machine for cutting potatoes into pieces of a size suitable for replanting as seed. Further objects will be disclosed in the course of the following specification, and are illustrated in the accompanying drawings, in which:

Figure 1 is a top or plan view of the machine.

Fig. 2 is a section on the line 2—2 in Fig. 1.

Fig. 3 is a sectional view of the machine as seen substantially on the line 3—3 in Fig. 2.

Fig. 4 is an enlarged detail section as seen on the line 4—4 in Fig. 2.

Fig. 5 is an enlarged detail view of the front end of the plunger.

Referring to the drawings by reference characters 6 designates a suitable frame, at one end of which is journaled in bearings 7 a crank shaft 8 having a pulley 9 adapted to be connected to an engine pulley by a belt. To the crank 10 of the crank shaft 8 is secured one end of a connecting rod 11, the other end being pivotally secured to the rear end of a plunger 12 which is slidable in a box or chamber 13. In the front end of the box 13 is rigidly secured a knife frame 14 consisting of a series of intersecting vertical and horizontal knives (see especially Fig. 4). The plunger 12 is provided with grooves 15 corresponding to said knives so that the potatoes to be cut will be pushed well into the knife frame before the plunger starts back again.

The potatoes are fed into the box 13 through a hole 16 from a hopper 17, by a feeder 18 which is notched as at 19 and which is connected by a connecting rod 20 to an eccentric 21 on the shaft 8. The shaft 8 is also provided with a crank 22 which is connected by a link bar 23 to a swinging lever 24 of a shaft 25 journaled in bearings 26 to the front end of the frame 6. Fixed on the shaft 25 is a gear pinion 27 which meshes with and actuates a vertical rack 28 which is secured on a vertically reciprocating knife 29. The knife 29 slides in two keepers 30 so that it will shear with the outer side of the knife frame 14.

In the operation and use of the machine it will be seen that when the hopper 17 is full of potatoes and the shaft 8 is being rotated the connecting members 11, 20 and 23 will all be actuated simultaneously. In the first movement, as the plunger 12 is being retracted the feeder 18 feeds a few potatoes from the hopper to the hole 16 where they drop in front of the knife frame. As the plunger then moves forward it presses them into the knife frame where they stay until the plunger again starts backward. With this last movement the knife 29 is brought down through the medium of the elements 22, 23, 24, 25, 29 and 28, cutting off the potatoes protruding through the knife frame. The next complete action of the machine then forces out the remaining parts of said potatoes and replaces them with a few more potatoes, which action, being repeated will eventually cut up all the potatoes in pieces of the right size and shape for seed.

From the foregoing it is believed that this invention will be understood by all those familiar with the present state of the art. I do not, however, desire to limit myself to the particular arrangements and construction as illustrated and described, but may see fit to embody a number of modifications, provided, however, that such modifications come within the spirit and scope of the appended claims.

Having now therefore fully shown and described my invention what I claim to be new and desire to protect by Letters Patent is:—

1. A machine of the class described consisting of a suitable frame, a box secured to the frame, a knife frame secured in one end of the box, a plunger slidably mounted in the box, said box having a hole through which potatoes may be dropped between said knife frame and plunger, a hopper secured above the box, a feeder adapted to feed potatoes from said hopper to said hole, and means for simultaneously actuating said feeder and plunger.

2. A machine of the class described consisting of a suitable frame, a box secured to the frame, a knife frame secured in one end of the box, a plunger slidably mounted in the box, a drive shaft at one end of the frame, a hopper secured above the box, a feeder slidably mounted on the box under said hopper and operative connection between said drive shaft and the plunger and feeder.

3. A machine of the class described consisting of a suitable frame, a knife frame secured thereto, means for pushing potatoes through the knife frame, a cutting knife vertically slidable in slots adjacent the outer side edges of the frame, a rack on said knife, a pinion journaled on the frame, the same being engageable with said rack, a crank arm adapted to actuate said pinion and means for alternatively actuating said crank arm and said pushing means.

In testimony whereof I affix my signature.

GEORGE A. DAVIDSON.